US012120405B2

(12) United States Patent
Toth et al.

(10) Patent No.: US 12,120,405 B2
(45) Date of Patent: Oct. 15, 2024

(54) MULTI-SPECTRAL IMAGING SYSTEM FOR MOBILE DEVICES

(71) Applicants: Michael Toth, Oakton, VA (US); Christopher A. Dykes, Punta Gorda, FL (US)

(72) Inventors: Michael Toth, Oakton, VA (US); Christopher A. Dykes, Punta Gorda, FL (US)

( * ) Notice: Subject to any disclaimer, the term of this patent is extended or adjusted under 35 U.S.C. 154(b) by 0 days.

(21) Appl. No.: 17/569,115

(22) Filed: Jan. 5, 2022

(65) Prior Publication Data

US 2022/0224844 A1 Jul. 14, 2022

Related U.S. Application Data

(60) Provisional application No. 63/199,594, filed on Jan. 11, 2021.

(51) Int. Cl.
*H04N 23/11* (2023.01)
*G03B 17/56* (2021.01)
*H04N 23/54* (2023.01)

(52) U.S. Cl.
CPC .......... *H04N 23/11* (2023.01); *G03B 17/561* (2013.01); *H04N 23/54* (2023.01)

(58) Field of Classification Search
CPC ...... H04N 23/11; H04N 23/54; G03B 17/561; G03B 15/05; G03B 33/02
See application file for complete search history.

(56) References Cited

U.S. PATENT DOCUMENTS

| 5,933,668 A | * | 8/1999 | Hyers | H04N 5/262 |
| | | | | 396/428 |
| D908,165 S | * | 1/2021 | Holland | D16/244 |
| 2003/0162510 A1 | * | 8/2003 | Kim | A45F 5/02 |
| | | | | 455/575.1 |
| 2011/0270092 A1 | * | 11/2011 | Kang | G01J 3/4406 |
| | | | | 600/476 |
| 2014/0028861 A1 | * | 1/2014 | Holz | G06V 10/143 |
| | | | | 348/208.4 |
| 2015/0253428 A1 | * | 9/2015 | Holz | G01S 7/483 |
| | | | | 356/5.01 |

(Continued)

FOREIGN PATENT DOCUMENTS

| CN | 103888738 A | * | 6/2014 |
| CN | 105466397 B | * | 9/2018 |

(Continued)

*Primary Examiner* — Michael Lee

(57) ABSTRACT

The present disclosure provides systems and methods for collecting multispectral images with a mobile device having a camera with an image sensor, such as a mobile phone. The systems and methods of the present disclosure control, support and power one or more light sources to emit single or multiple wavelengths of light onto an object. The system further supports and controls the camera within the mobile device to capture a series of images or video in the different or same light wavelengths and geometries. The resulting series of images may be used individually or collectively to detect and compare features in an object. This system may be used for the capture of multispectral images or video that could individually or collectively reveal features in the object that may not be visible in a single image.

15 Claims, 15 Drawing Sheets

(56) References Cited

U.S. PATENT DOCUMENTS

| | | | | |
|---|---|---|---|---|
| 2015/0304612 A1* | 10/2015 | Richards | ................ | H04N 7/188 |
| | | | | 348/159 |
| 2016/0209025 A1* | 7/2016 | Matthews | ............. | F21V 7/0075 |
| 2018/0191879 A1* | 7/2018 | Evans, V | ................ | H04N 23/51 |
| 2021/0092295 A1* | 3/2021 | Zhao | ......................... | G06T 5/50 |
| 2022/0088251 A1* | 3/2022 | Barnes | ...................... | A61L 2/24 |

FOREIGN PATENT DOCUMENTS

| | | | | |
|---|---|---|---|---|
| JP | 2006148478 A | * | 6/2006 | |
| JP | 2013179418 A | * | 9/2013 | |

\* cited by examiner

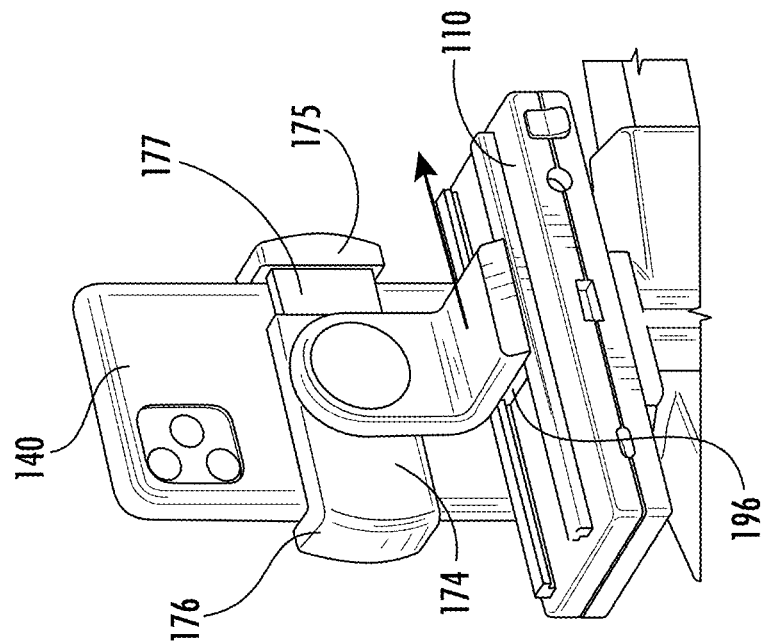
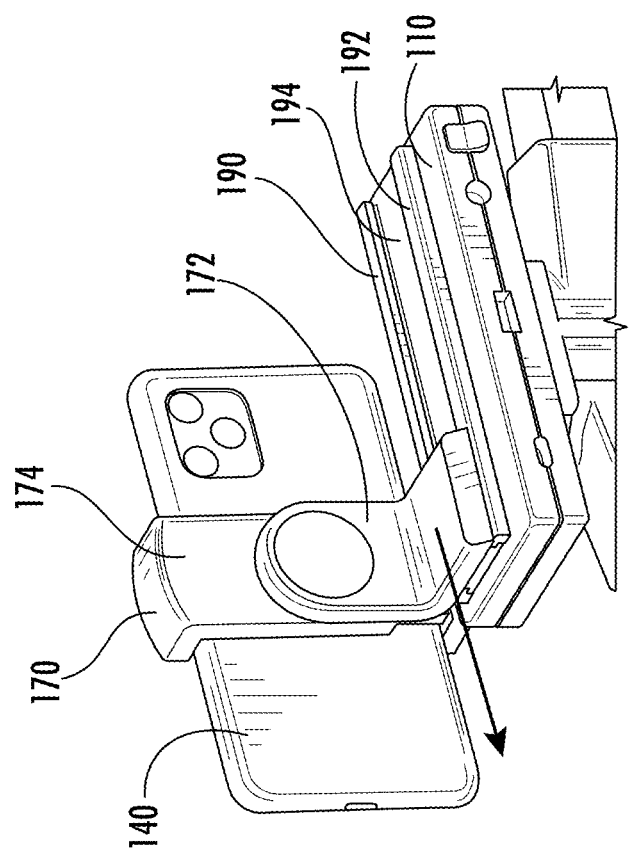

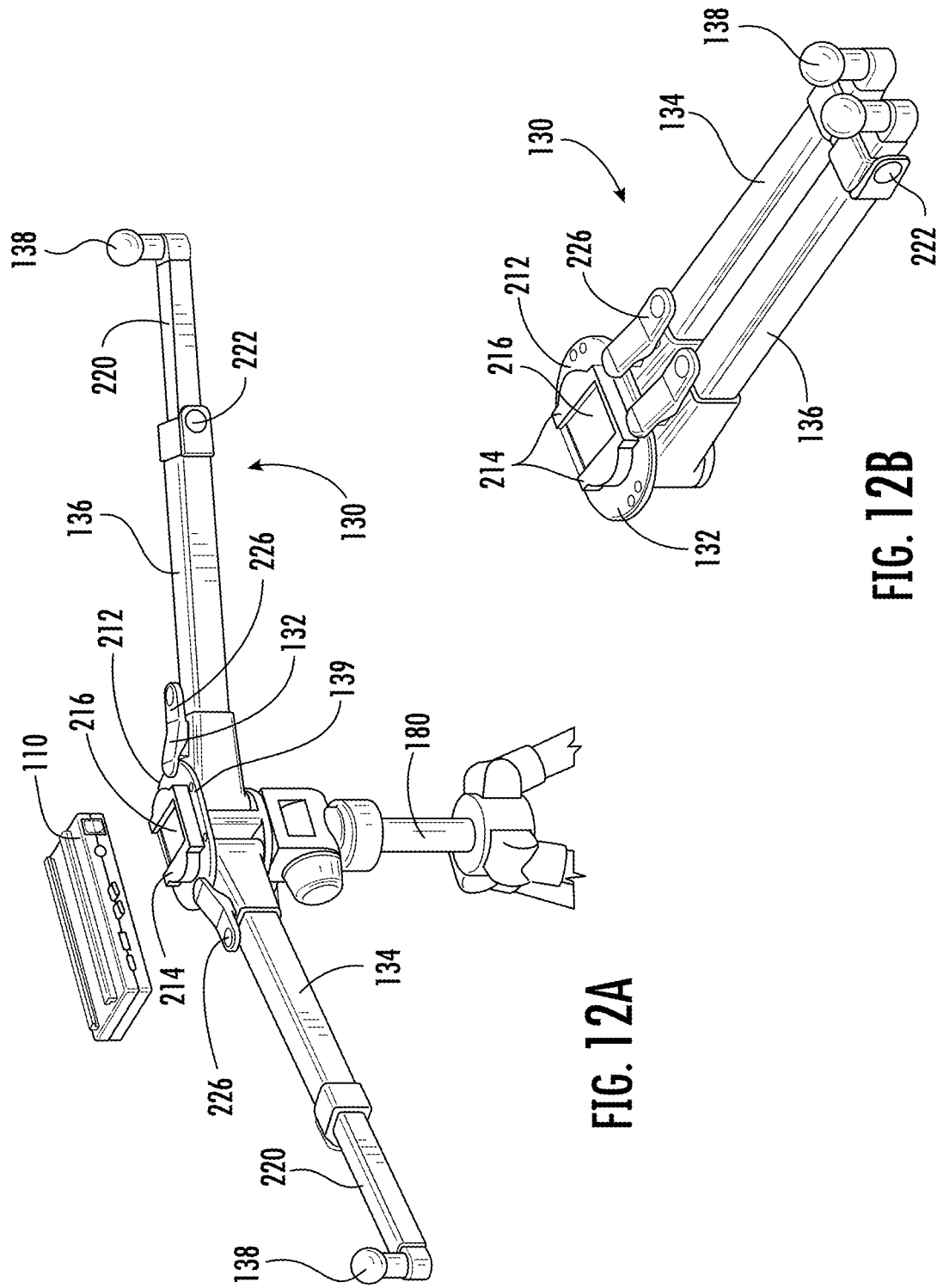

MULTI-SPECTRAL IMAGING SYSTEM FOR MOBILE DEVICES

TECHNICAL FIELD

The present disclosure generally relates to imaging systems and more particularly to systems and methods for capturing multispectral images of an object with a mobile device.

BACKGROUND

Current imaging systems that capture multiple images of an object utilize large cameras and light panels operated through computers. A multispectral image is one that captures image data within specific wavelength ranges across the electromagnetic spectrum. The wavelengths may be separated by filters or detected via the use of instruments that are sensitive to particular wavelengths, including light from frequencies beyond the visible light range, i.e. infrared and ultra-violet. Multispectral imaging can allow for the extraction of additional information that the human eye fails to capture with its visible receptors for red, green and blue. These images can be used for photogrammetry, medical, forensics, health and safety, cultural heritage and other applications to capture sequences of registered or overlapping images for analysis, including to detect faint residues of substances.

Smartphones and other lightweight electronic digitization systems include portable cameras with integrated processors and operating systems to capture digital images. Small, lightweight light panels and other illumination sources are available to provide illumination for the camera. Conventional imaging systems, however, are not designed for controlling, powering and connecting both the smartphone and the multiple lights required to capture multispectral images.

It would therefore be desirable to provide systems and methods for capturing multispectral images with mobile devices, such as smartphones and the like.

SUMMARY

The present disclosure provides systems and methods for collecting multispectral images with a mobile device having a camera with an image sensor, such as a mobile phone, camera phone, smartphone, phablet, smartwatch, tablet, netbook, handheld computer, single board (e.g. Raspberry Pi) or multiple board computer, laptop, personal digital assistant, or the like. The systems and methods of the present disclosure control and power one or more light sources to emit single or multiple wavelengths of light onto an object. The system further controls the camera within the mobile device to capture a series of images in the different light wavelengths. The resulting series of images may be used individually or collectively to detect and compare features in an object. This system may be used for the capture of multispectral images that could individually or collectively reveal features in the object that may not be visible in a single image. It also may be used for illumination in standard photography, video, photogrammetry and digitization operations.

The systems and methods of the present disclosure increase the portability and efficiency of the transportation, setup, connection and imaging by overcoming inherent problems of collecting multiple registered or correlated images with both a mobile device and light sources with independent controls, power supplies and connections, or single images or video. The systems and methods discloses herein reduce the cost and complexity of operating a mobile device with a camera and lights, with ease of use, common power source and connections. These systems and methods accelerate and improve the capture of a series of images of an object with both a mobile device and lights, or a single image or video. This offers advantage to practitioners in the fields of photography, photogrammetry, medicine, forensics, health and safety, and other professions in which practitioners need to quickly capture sets of images or video to advance their research and analysis.

In one aspect, a system for collecting multispectral images with a mobile device having a camera comprises one or more light modules configured to emit light onto an object in at least first and second wavelength or the same wavelengths. A controller is operatively coupled to the light modules and the mobile device. The controller is configured to control the mobile device and the light modules to capture at least a first image of the object in the first wavelength and a second image of the object in the second wavelength, or both in the same wavelength. A processor is configured to store, align, edit, calibrate, refine and/or integrate the first and second images to form a combined image in the first and second wavelengths or the same wavelengths. The processor may be disposed within the controller, or suitably coupled to the controller through wired or wireless connections.

In another aspect, a system for collecting multispectral images with a mobile device having a camera comprises one or more light modules configured to emit light onto an object in at least first and second geometries (i.e., orientations, angles and/or distances between the light module and/or the camera and the object). A controller is operatively coupled to the light modules and the mobile device. The controller is configured to control the mobile device and the light modules to capture at least a first image of the object in the first geometry and a second image of the object in the second geometry. A processor is configured to store, align, edit, calibrate, refine and/or integrate the first and second images to form a combined image in the first and second geometries. The processor may be disposed within the controller, or suitably coupled to the controller through wired or wireless connections.

In certain embodiments, the light sources are light modules configured to emit light in different orientations, layouts, including linear or circular, bands of wavelengths or combinations of wavelengths, such as the visible spectrum, UV, IR, Near-IR, Far-IR or the like. The light modules may comprise a plurality of light emitting devices, such as LEDs or the like, that are each configured to emit light in a single wavelength or multiple wavelengths. In certain embodiments, the system includes at least two light modules configured to be positioned relative to the mobile device camera such that the entire image is captured in the selected light wavelengths. Other methods of generating electromagnetic energy may also be mounted as light sources, including coherent light sources like lasers.

The controller may include control circuits for controlling the light modules to emit light only in certain bands, or single, wavelengths of light. The control circuits may include hardware, software, computer executable algorithms and/or other suitable control circuits. The controller may further comprise a user interface that allows the operator to select the light settings or wavelengths emitted by the light modules.

The controller may further include control circuits for operating the camera in the mobile device in synchronization with the light modules. This allows an operator to capture images of the object in each of the different bands, or single, wavelengths. The controller and/or the processor may further include one or more control circuits for integrating, registering, enhancing, editing, calibrating and/or manipulating the series of images to create a combined image with different or the same wavelengths. This allows an operator to view a single combined image or video that may reveal features of the object that would otherwise not be visible.

The controller and/or the processor may be further configured to electronically record the first and second images and the combined image, or a single image or video. The controller and/or the processor may be configured to transmit the electronically recordings of the images to a remote source, such as another processor, computer, cloud-based server or the like.

In certain embodiments, the system further includes a support structure for mounting and supporting the controller, the mobile device and/or the light modules. The support structure may comprise a central support for coupling to the controller, and one or more extension arms for mounting the light modules. The extension arms have proximal and distal ends and are coupled to the central support at the proximal ends. The extension arms further comprise mounts on their distal ends for receiving and supporting the light sources. The extension arms are preferably movable between extended and retracted configurations to move the light modules towards or away from the controller. The extension arms may also be rotatably coupled to the central support. In this manner, the light modules may be positioned at a desired angle and distance from the controller and mobile phone in order to optimize the light transmitted to the object and/or captured by the camera.

In certain embodiments, the system may further include a coupling device for coupling the mobile device to the controller and/or the support structure. The coupling device may be rotatably and slidably coupled to the controller or the support structure. This allows the operator to rotate the mobile device relative to the object to capture the desired orientation. In addition, the mobile device may be moved horizontally relative to the object to, for example, position the camera lens facing the center of the object and/or at the centerline of the imaging system.

It is to be understood that both the foregoing general description and the following detailed description are exemplary and explanatory only and are not restrictive of the disclosure. Additional features of the disclosure will be set forth in part in the description which follows or may be learned by practice of the disclosure.

The foregoing and other features of the present disclosure will become apparent to one skilled in the art to which the present disclosure relates upon consideration of the following description of exemplary embodiments.

BRIEF DESCRIPTION OF THE DRAWINGS

FIGS. 8A and 8B are perspective views of the support of FIGS. 7A and 7B, illustrating horizontal displacement of the mobile device;

FIG. 12A illustrates a support structure for use with the imaging system of FIG. 2 in an extended configuration;

FIG. 12B illustrates the support structure of FIG. 12A in a closed configuration;

DETAILED DESCRIPTION

The present disclosure provides various provides systems and methods for collecting multispectral images of an object in various wavelengths of light. The systems and methods of the present invention may be used to capture registered or overlapping images for analysis and detection of substances or features in a variety of applications, such as photogrammetry, cultural heritage, medicine, forensics, health and safety, and other applications in which practitioners need to quickly capture and transfer sets of multi-spectral and/or multiple image data to advance their work, research and analyses.

The systems of the present disclosure may be used for the capture of single or multiple images, video or multispectral images with a camera on a mobile device, such as a mobile phone, to individually or collectively reveal features in the object that may not be visible in a single image. The systems may control a mobile computing device, a mobile phone and light sources to optimize the capture of images in single or multiple wavelengths of light with the camera image sensor. The systems may control the communications with the mobile device to transfer multiple digital images of the object to an external processor or cloud-based server.

Figure 1:
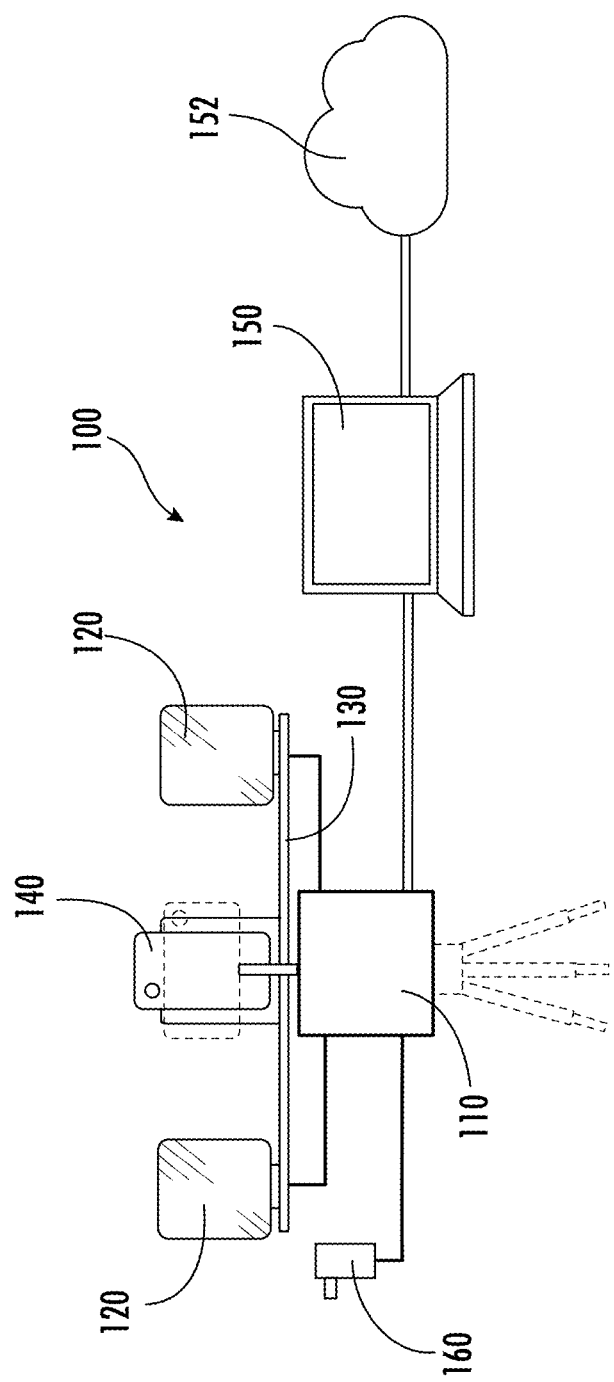
FIG. 1 is a schematic illustration of a representative multi-spectral imaging system according to the present disclosure.

Referring now to FIG. 1, a multi-spectral imaging system 100 according to the present disclosure will now be described. Imaging system 100 comprises a controller 110, one or more light sources 120 and a support structure 130 for supporting controller 110 and controlling the positions of light sources 120 relative to a subject or object to capture images of the object. System 100 may further include a mobile device 140, a processor 150 coupled to controller 110 and a power source 160 for providing power to system 100.

Mobile device 140 may be any mobile communications device that includes an integrated and/or external camera(s) 142 and an internal or external data processor (not shown), such as a mobile phone, camera phone, smartphone, phablet, smartwatch, tablet, netbook, handheld computer, single board (e.g. Raspberry Pi) or multiple board computer, laptop, personal digital assistant, or the like. Mobile device 140 preferably includes a digital image sensor that detects and conveys information used to make an image of an object. The digital image sensor converts the variable attenuation of light waves as they reflect off or fluoresce from the object into signals, such as small bursts or energy that convey the information. Additional external components may be mounted with or on the mobile device, including filters, lenses, diffraction gratings, polarizers, lasers, etc.

Processor 150 may be any device having a central processing unit, such as a computer, workstation, server, mainframe, cloud-based processors or the like. Processor 150 may be coupled to controller 110 via wired connections or wirelessly, such as with cell phone networks, wireless local area networks (WLANs), wireless sensor networks, satellite communication networks radio waves (e.g., Bluetooth) and the like. Processor 150 may be wirelessly coupled to a separate cloud-based server 152, mainframe or other server. In some embodiments, processor 150 is integrated within controller 110.

Controller 110 is configured to direct the capture of images or video from different illuminations and/or wavelengths by the digital image sensor in mobile device 140. In certain embodiments, controller 110 includes software, executable computing functions and/or control circuits for controlling mobile device 140 to capture multispectral or other digital images with the camera 142 of mobile device 140.

Processor 150 and/or controller 110 comprises a user interface, such as a keyboard, mouse, touchscreen, voice control or other suitable man-machine interface for allowing the operator to control imaging system 100. Processor 150 and/or controller 110 comprises suitable hardware, software, computer executable algorithms and/or control circuits (collectively referred to hereafter as a generic term "control circuits") to operate light sources 120 and mobile device 140. These control circuits may be coupled to light sources 120 and mobile device 140 directly by wires or other connections, wirelessly via radio transmission, or other suitable means known to those of skill in the art. Processor 150 and/or controller 110 may also include an internal database that includes various folders or libraries of folders, metadata, images, documentation files and/or associated "read me" files that contain information about other files in a directory or archive of computer software.

Controller 110 and/or processor 150 includes control circuits and/or software for capturing a series of multispectral or other images and digitally combining, editing, enhancing, calibrating, "registering" and/or manipulating these images. This may include the ability to crop, rotate, zoom, filter, enhance and/or perform other image viewing and/or editing of images or video from the camera 142. In this instance, the data includes multiple images of the object 200 taken by the camera 142 with different wavelengths and/or geometries. The control circuits in controller 110 and/or processor 150 are capable of combining, registering or aligning all of these images into one single image and/or video that can be viewed by the operator. It may also include producing grey scale, black and white, false color and/or other images and/or histograms from the image(s) or video captured by the camera 142 and mobile device 140, and/or digitally combining the captured image(s) or video to reveal and/or highlight features of interest.

Controller 110 and/or processor 150 further includes one or more control circuits for adjusting the light settings in light sources 120. Light settings refers to a particular band of wavelengths (or a single wavelength) that will be emitted onto the object from light sources 120. These control circuits will accept input from a user (i.e., a desired wavelength or band of wavelengths) and adjust light sources 120 such that they emit light onto the object 200 in the selected wavelengths. Alternatively, the control circuits may be configured to automatically select certain predetermined light settings for a certain application. The controller 110 and/or processor includes one or more control circuits for controlling the camera 142 on mobile device 140 to capture images or video in the selected wavelengths. This allows for simultaneous control of mobile device 140 and light sources 120 to capture a series of images of object 200 with sequential lighting in different or the same wavelengths.

The controller 110 and/or processor includes additional control circuits for manually or automatically controlling the image capture by mobile device 140. The controller 110 and/or processor 150 may also include control circuits or software for creating previews of the images that can be viewed by the operator on a screen, such as a computer screen or the like. These previews allow the operator to determine if a particular image in a single wavelength or band of wavelengths is desired, and to frame and orient the image.

Controller 110 and/or processor 150 may further include suitable hardware, software, computer executable algorithms and/or control circuits to analyze and digitally process the images captured by mobile device 140. This may include control circuits or software to normalize the series of images from the camera 142 to the minimum and maximum values, and perform statistical techniques on the series of images to provide supervised classification and/or transform the image data into a new data set. This includes performing linear or nonlinear regression techniques to transform and analyze image sets, as well as measuring distances and geometries and angles between the camera 142 and the object. It may label images from the camera 142 with filenames and store metadata in and/or with the images, convert the images to different output formats, and/or provide an interface to other automatic or manual imaging software.

Controller 110 and/or processor 150 may further include a user interface, such as a check box or the like, to label the function of adding a particular wavelength image to the list of images to be captured as part of the sequence. The label may appear on every wavelength image and can be used as a standard placement of the function for each image. Thus, when the operator scrolls through the wavelengths, the check box can be selected if a particular image looks valuable. It may also allow the operator to select, tag and/or catalog images.

Controller 110 and/or processor 150 further includes control circuits for the camera 142 to electronically record images or video with both optimal lighting and camera settings, and control circuits for electronically controlling the lighting to optimize the lighting in conjunction with the camera settings. Controller 110 may further include control circuits for varying light spectral composition, intensity, exposure time, and/or spatial lighting variance in light sources 120 and/or mobile device 140 and control circuits for communications through mobile device 140 to transfer multispectral image data. Controller 140 may further include software and control circuits for electronically transferring data from mobile device 140 to processor 150 or to cloud-based servers 152.

Controller 110 may further comprise one or more rechargeable batteries and/or a charging interface for providing power to the mobile device 140 and/or light modules 120 via suitable connectors or wirelessly.

Figure 2:
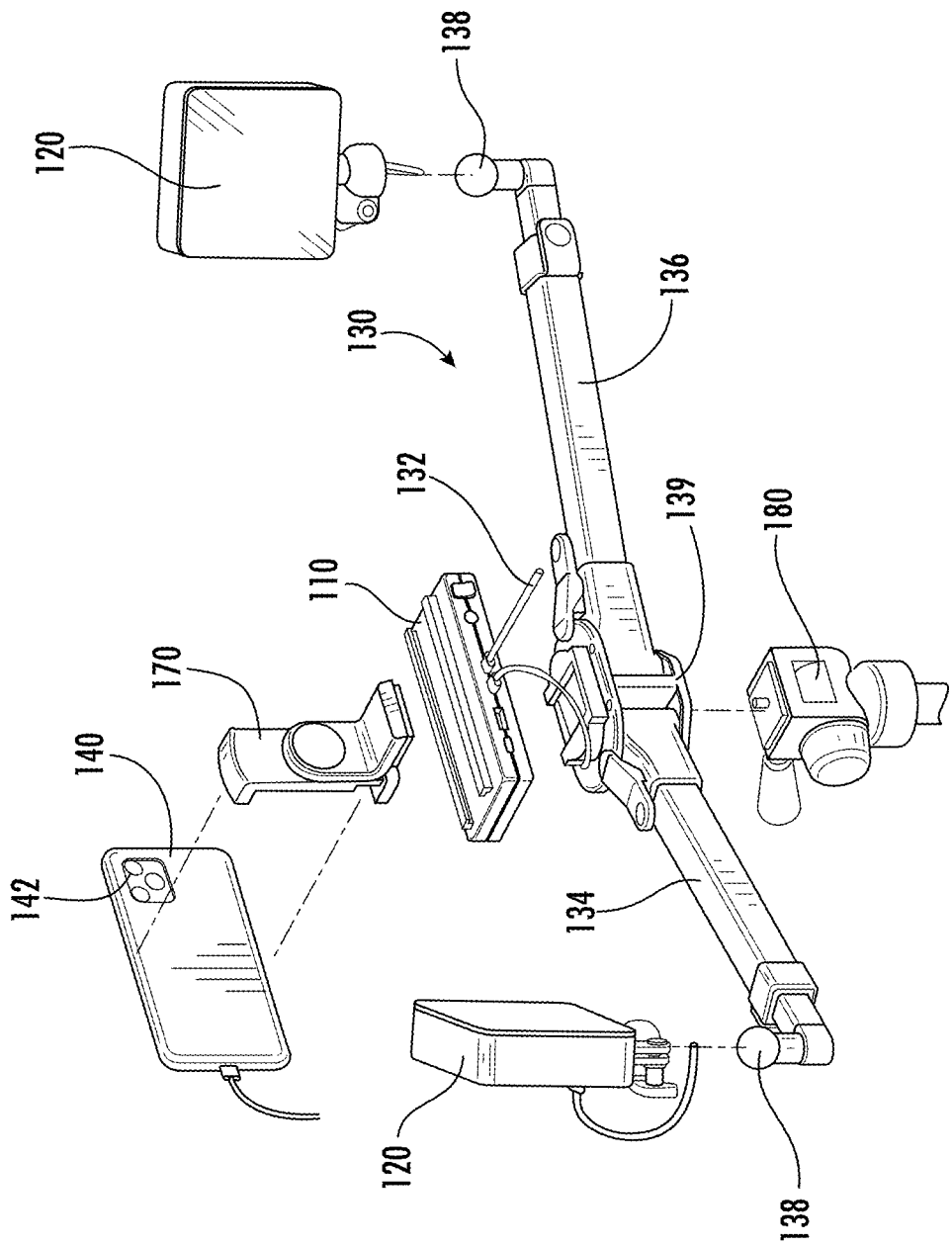
FIG. 2 is an exploded view of a multi-spectral imaging system according to the present disclosure.
Figure 3:
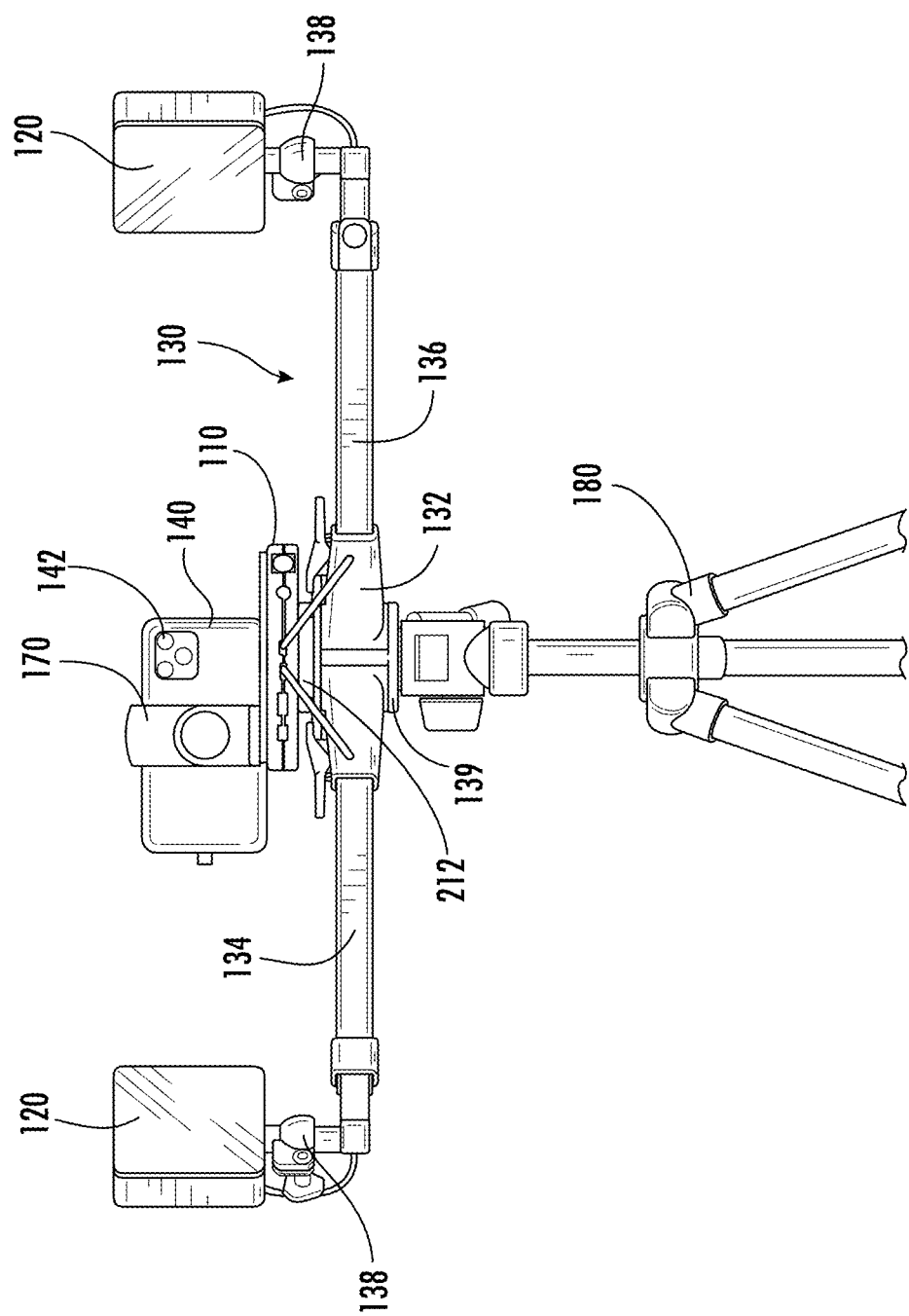
FIG. 3 is a rear view of the multi-spectral imaging system of FIG. 2.

As shown in FIGS. 2 and 3, support structure 130 includes a central support portion 132 for receiving and supporting controller 110 and mobile device 140. Support structure 130 further includes first and second extension arms 134, 136 extending outward from central support 132. Extension arms 134, 136 each include a support 138 for mounting light modules 120 thereon and are configured to allow the operator to position and measure light modules 120 at a desired angle and distance from mobile device 140 in order to provide sufficient light onto the object to capture images therefrom, as discussed in more detail below.

Imaging system 100 may further include a mobile device support 170 for mounting mobile device 140 to controller 110. Alternatively, mobile device 140 may be mounted to a separate support structure, or directly to support structure 130. Imaging system 100 may further including a stand 180, such as a tripod or similar device, for supporting support structure 130 and allowing for vertical positioning of imaging system 100 relative to an object 200 (see FIG. 13). Support structure 130 includes a mount 139 for mounting support structure 130 to stand or tripod 180. Support structure 130 may also provide a stable platform for mounted mobile device 140 so images captured with the camera 142 are registered, wherein two or more images of the same scene or object are aligned.

Figure 4A:
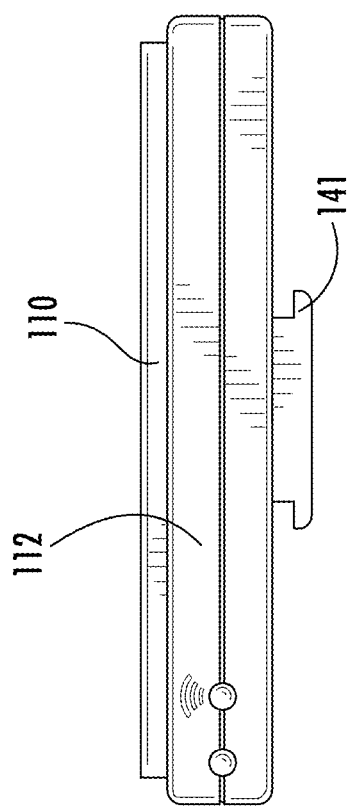
FIGS. 4A and 4B are front and rear views, respectively, of a controller for the imaging system of FIG. 2.
Figure 4B:
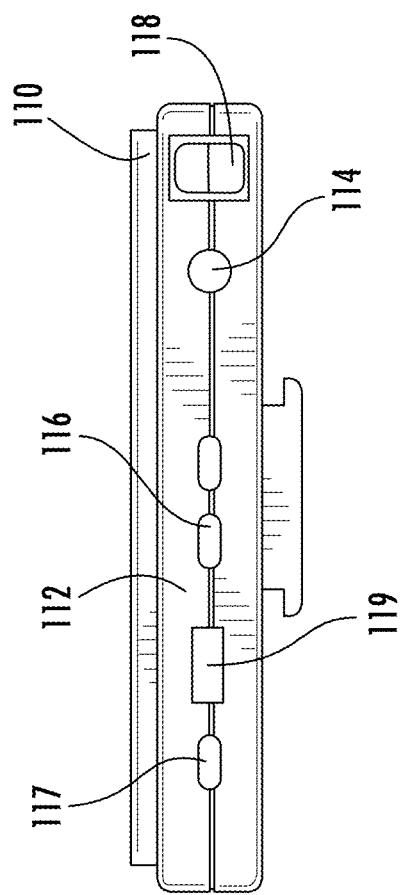

Referring now to FIGS. 4A and 4B, controller 110 preferably comprises a housing or enclosure 112, a power connector 114, light module connectors 116, a mobile device connector 117 and a power switch 118. Controller 110 may further include a wired connector 119 for an external processor 150, such as a computer, server, cloud-based system or the like. Alternatively, controller 110 may be wirelessly coupled to any or all of the external processor 150, light modules 120, mobile device 140 or power source 160. Controller 110 may include fault detection software and hardware, with indicator lights that demonstrate power and data connectivity.

Figure 6:
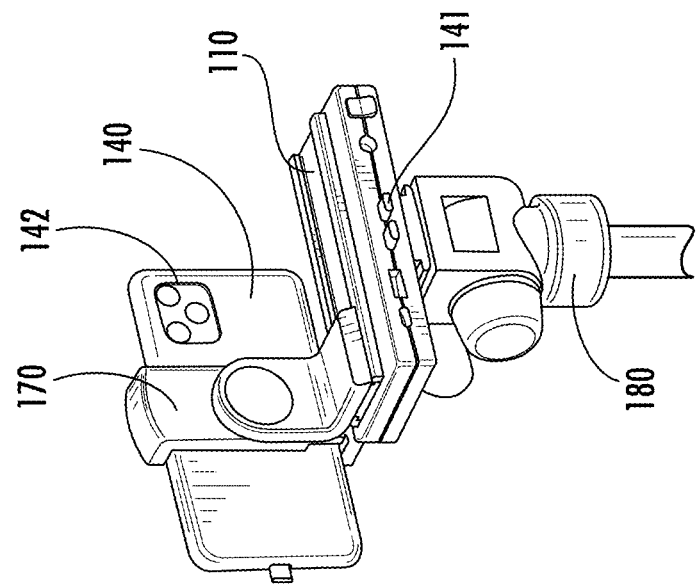
FIG. 6 is a perspective view of the controller of FIGS. 4A and 4B being mounted to a separate stand.
Figure 5:
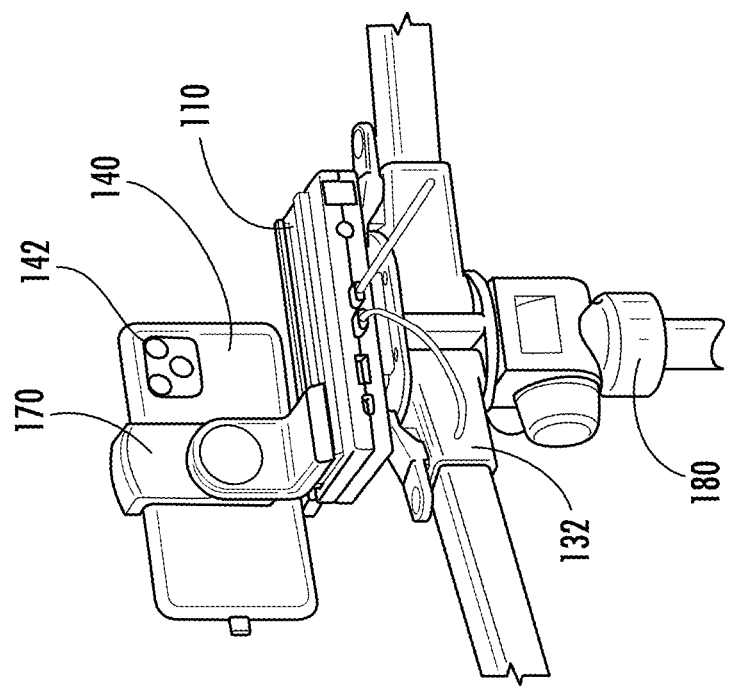
FIG. 5 is a perspective view of the controller of FIGS. 4A and 4B being mounted to the imaging system of FIG. 2.

As shown in FIG. 5, controller 110 further includes a mount 141 for coupling controller 110 to central support 132 of extension system 130. Mount 141 and central support 132 serve to support controller 110 and mobile device 140 and to fix the position of mobile device 140 relative to the object 200. In an alternative embodiment, mount 141 may be configured to couple controller 110 directly to a stand 180, such as a tripod or the like (see FIG. 6). In this latter embodiment, light modules 120 and controller 110 are mounted to separate, stand-alone tripods or stands 180 that can be moved to adjust the distance and or angle therebetween.

Figure 7B:
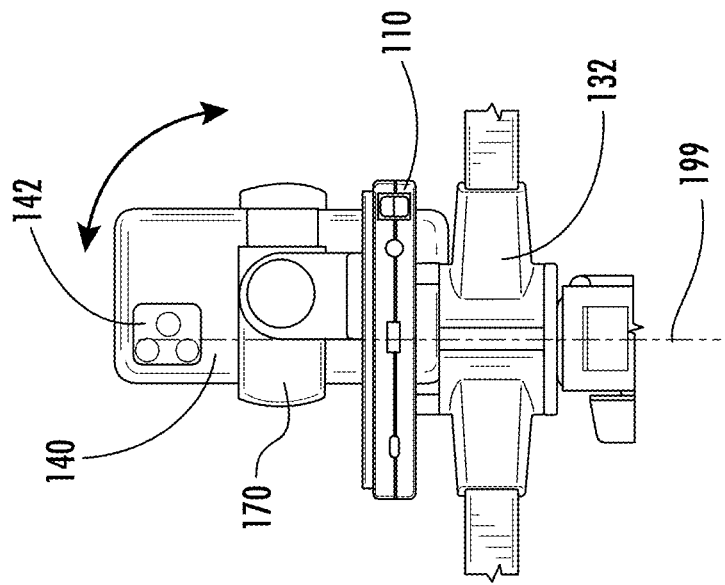
FIGS. 7A and 7B are perspective views of a support for a mobile device for the imaging system of FIG. 2, illustrating rotation of the mobile device.
Figure 7A:
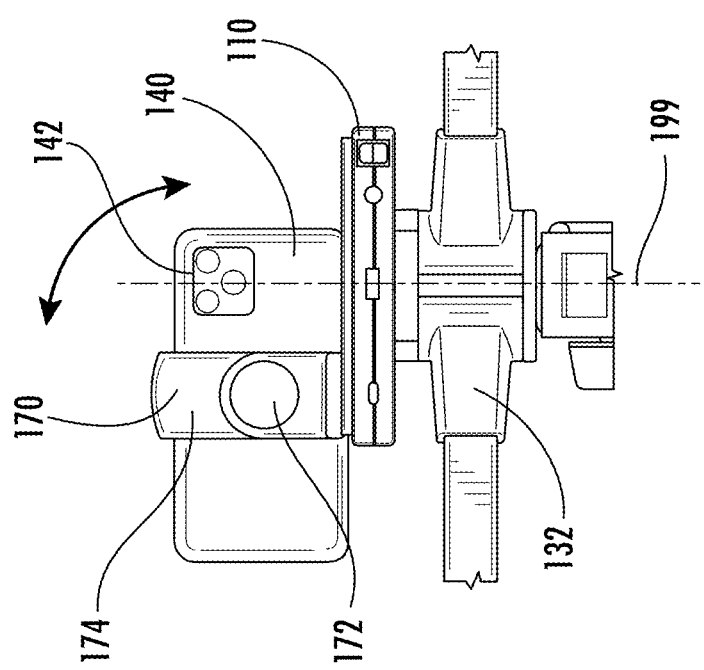

FIGS. 7A and 7B illustrate one embodiment of mobile device support 170. As shown, support 170 rotatably couples mobile device 140 to controller 110 and central support such that mobile device 140 may be rotated between a substantially horizontal position (FIG. 7A) and a substantially vertical position (FIG. 7B), or any position therebetween In one such embodiment, support 170 includes a main body 172 configured for coupling to controller 110 and a coupling arm 174 rotatably coupled to main body 172. This allows the operator to select a horizontal, vertical or other position of the camera 142 within mobile device 140, depending on the desired view of the object.

As best shown in FIG. 8B, coupling arm 174 preferably includes first and second projections or flanges 175, 176 extending laterally outward from arm 174 and configured for positioning on either side of mobile device 140. Coupling arm 174 further includes a telescoping central section 177 configured for longitudinal displacement relative to the remainder of arm 174 to move coupling arm 174 between an extended position and a contracted position. The extended position allows flanges 175, 176 to be placed on either side of mobile device 140. Telescoping central section 177 is preferably biased towards the contracted position by a suitable mechanism, such as a compression spring, coil spring or the like, or it may be contracted with a jack screw. In use, the operator extends second projection 175 outward such that mobile device 140 may be positioned within projections 175, 176 and then allows the projection to be pulled into the contracted position around mobile device 140.

As shown in FIGS. 8A and 8B, mobile device support 170 may also be slidably coupled to controller 110 such that mobile device 140 may be displaced horizontally relative to controller 110. In one such embodiment, controller 110 includes first and second ribs 190, 192 on either side of a central groove 194. Main body 172 of mobile support device 170 includes a projection 196 configured to slide through central groove 194 of controller 110. Ribs 190, 192 preferably have ledges that overhang groove 194 such that main body 172 may be slid horizontally through groove 194 without being decoupled from controller 110. This allows the operator to position the camera lens(es) and/or sensor within mobile device 140 at any desired position, e.g., to align the sensor and/or camera lens(es) centerline with the centerline of the system 199 and/or the center of the object 200, as shown in FIG. 7.

Figure 9B:
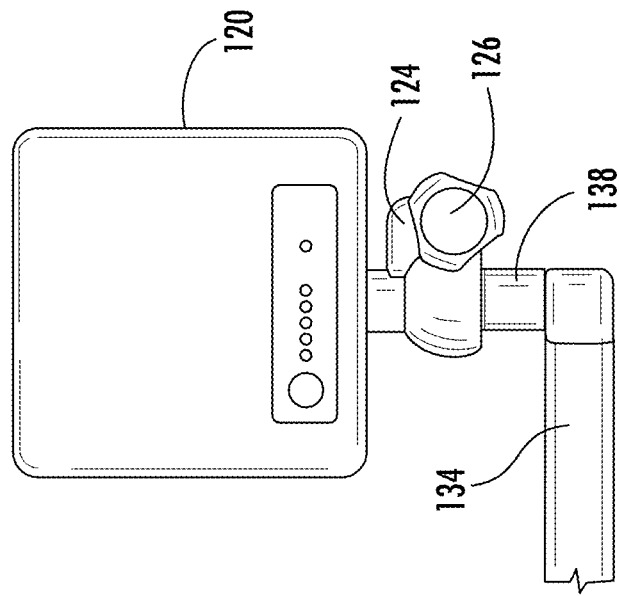
FIGS. 9A and 9B are front and rear views, respectively, of a light module for the imaging system of FIG. 2.
Figure 9A:
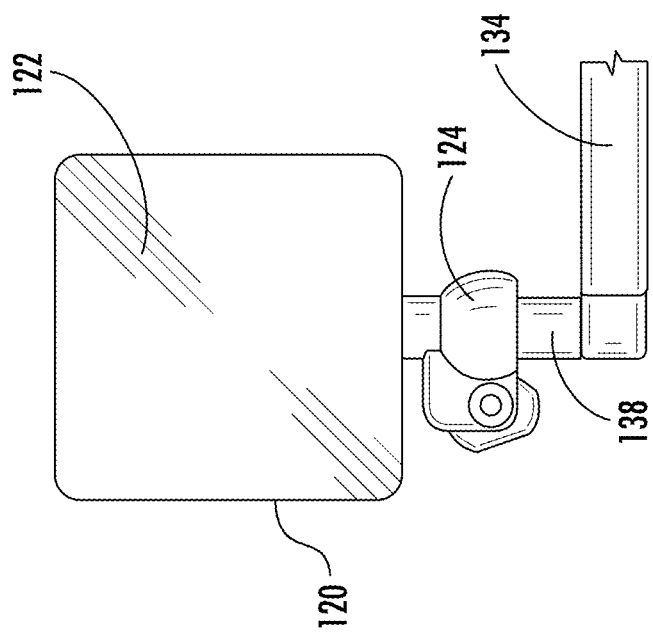
Figure 10:
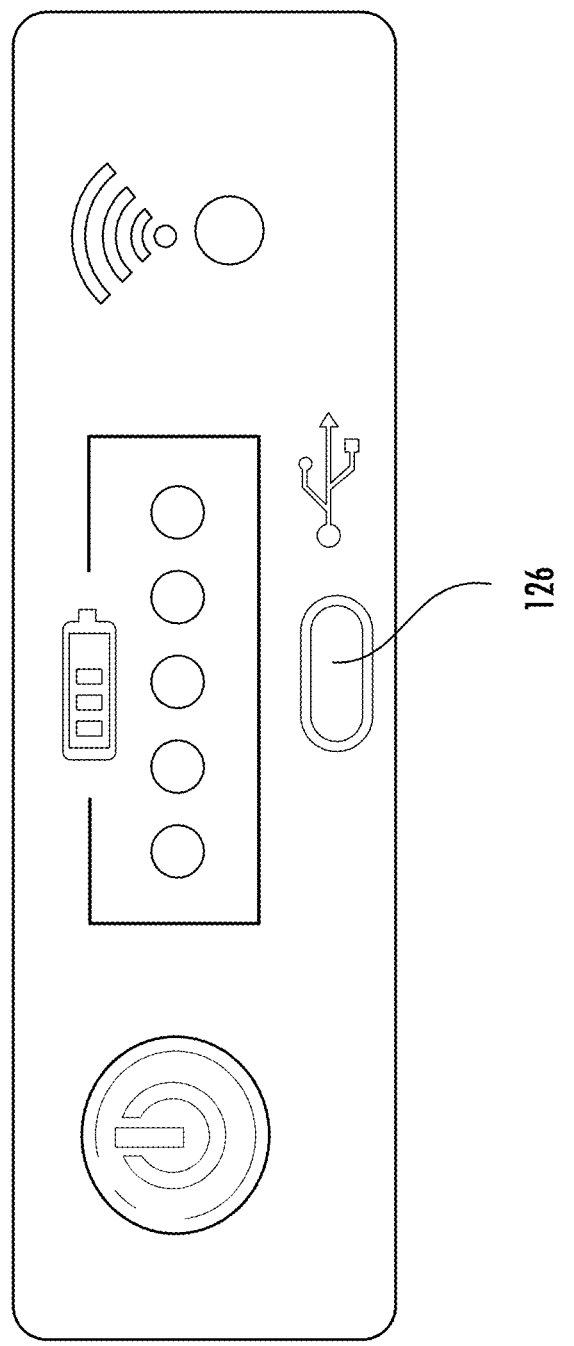
FIG. 10 is a close-up view of one portion of the light module of FIGS. 9A and 9B.
Figure 13:
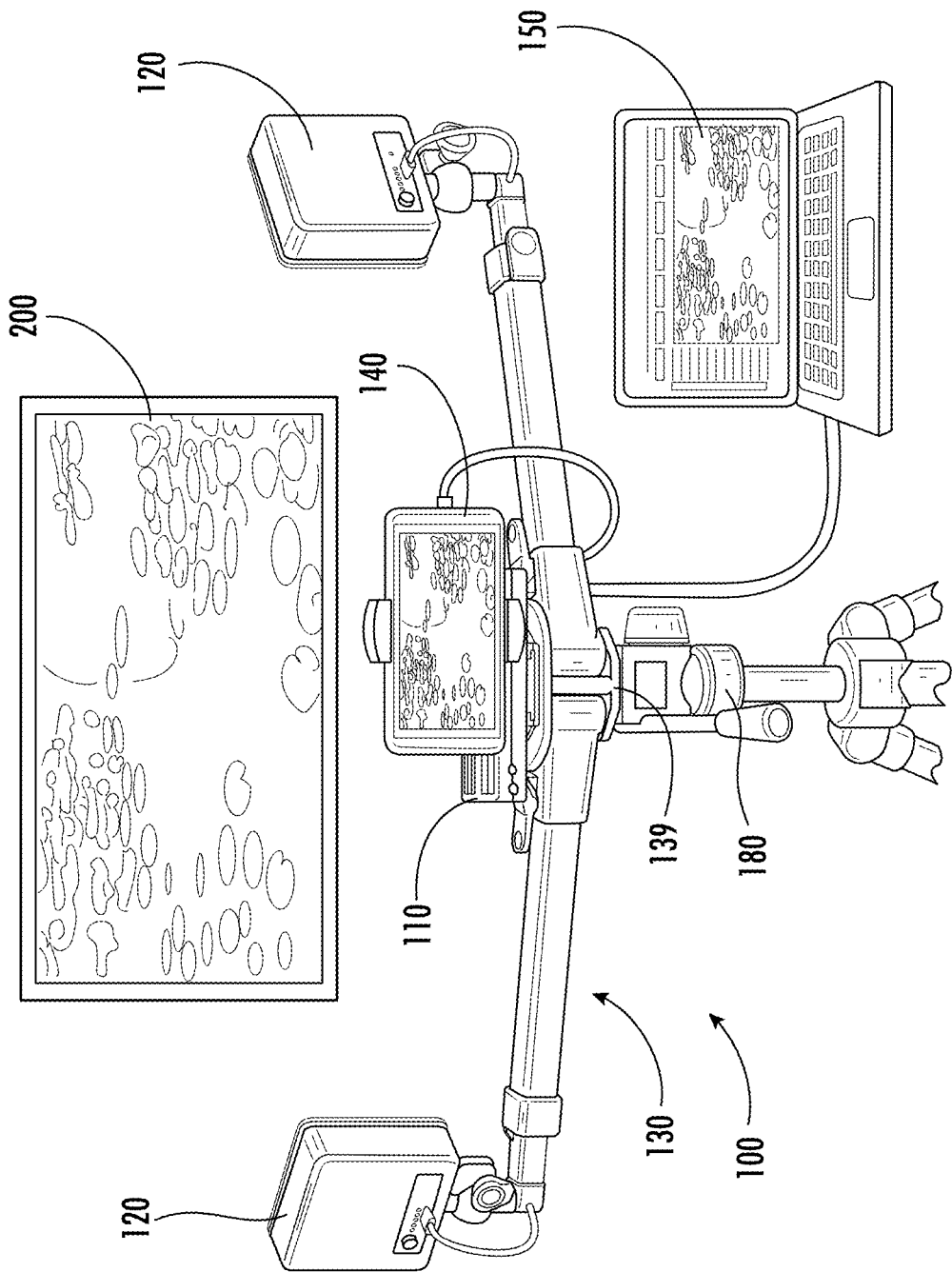
FIG. 13 illustrates the imaging system of FIG. 2 in use with a representative object for imaging.

FIGS. 9 and 10 illustrate one embodiment of a light module 120 according to the present invention. Imaging system 100 may include one or more light modules 120. In one embodiment, imaging system 100 includes two light modules 120 that can be positioned to emit light from either side of object 200 and/or mobile device 140, as shown in FIG. 13. Providing two light modules 120 to emit light from a selected angle and distance on either side of object 200 ensures that the entire object 200 (or selected areas) is illuminated with the selected wavelengths of light emitted from modules 120. Of course, those of skill in the art will recognize that the present disclosure is not limited this configuration and the number, positions and geometry of the light modules may vary depending on the size or shape of the object(s) to be imaged. The term "geometry" is herein defined as the orientation, angle and/or distance between an individual light module and/or the camera and the object. For example, imaging system 200 may include three or more light modules, or the light modules may, for example, be positioned above and below object 200 and/or mobile device 140. In another alternative embodiment, imaging system 100 includes four light modules positioned diagonally from each of the corners of object 200.

As shown, light module 120 comprises an array, panel, screen or other suitable radiating device 122 having one or more light sources for transmitting a plurality of specific wavelengths of electromagnetic energy to the object 200. The light sources may comprise any suitable type of narrow or broad band of light emitters. In one embodiment, the light sources comprise, but is not limited to, a plurality of light emitting diodes (LEDs) designed to emit light in a variety of different wavelengths, including the visible, UV, IR, near-IR or far-IR light spectrums. These may include all LEDs in integrated unitary modules, or separate modules mounted together to provide illumination in different wavelengths, e.g., a module with visible wavelengths and others with UV and/or IR wavelengths. The light modules may include LEDs mounted in linear or circular geometry. LEDs may emit light in broad or narrow wavelengths of light. For example, LEDs may emit a single wavelength of light or any combination of multiple wavelengths. The LEDs may also be configured to simultaneously emit all of the wavelengths of the UV spectrum, the IR spectrum and/or the visible spectrum at equal intensity (i.e., white light). Light modules 120 may comprise other sources and methods of generating electromagnetic energy.

Light module 120 may further comprise one or more rechargeable batteries and/or a wireless charging interface (not shown) for providing power to the LEDs. Alternatively, light module 120 may be connected to controller 110 via suitable connectors or wirelessly to provide power to LEDs from one or more batteries and/or a charging interface in the controller as noted below.

Light module 120 further comprises a mount 124 for attaching module 120 to support 138 of extension arms 134. Mount 124 further comprises a rotatable knob or other control 126 for rotating module 120 relative to support structure 130. This allows the operator to control the angle in which the LEDS project light from light modules 120 onto the object 200, as discussed in further detail below.

As shown in FIG. 10, light module 120 may further include a charging and communications port 126 for coupling light module 120 to controller 110. In addition, light module 120 may include a variety of other user inputs and/or indicators, such as an ON/OFF switch, power and battery indicator, and a wireless communication indicator.

Figure 11:
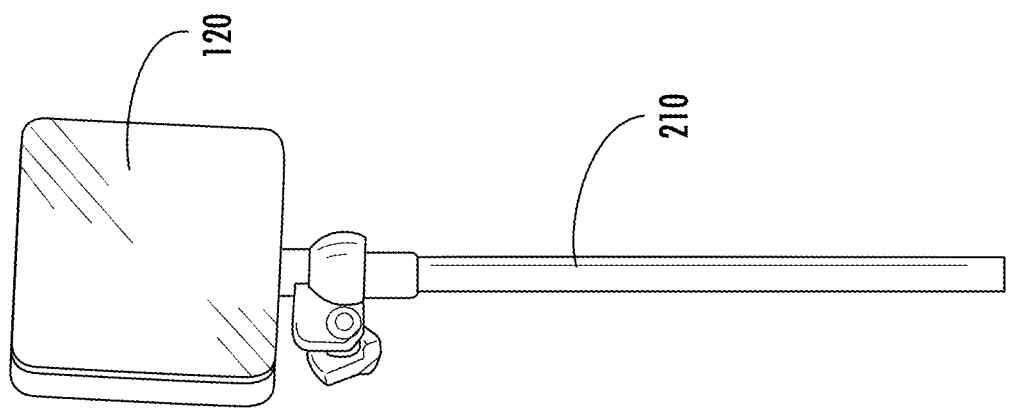
FIG. 11 is a perspective view of an alternative embodiment of a light stand for the light module of FIGS. 9A and 9B.

A light module 120 is preferably mounted to each of the extension arms 134, 136 of support structure 130, as shown in FIG. 2. In an alternative embodiment, light modules 120 may each be mounted to a separate light stand 210, as shown in FIG. 11. In this embodiment, light modules 120 are not coupled to controller through a support structure 130, but can be stand-alone components of imaging system 100. The lights may further be alternately positioned behind the object for transmission of light through the object.

Figure 12C:
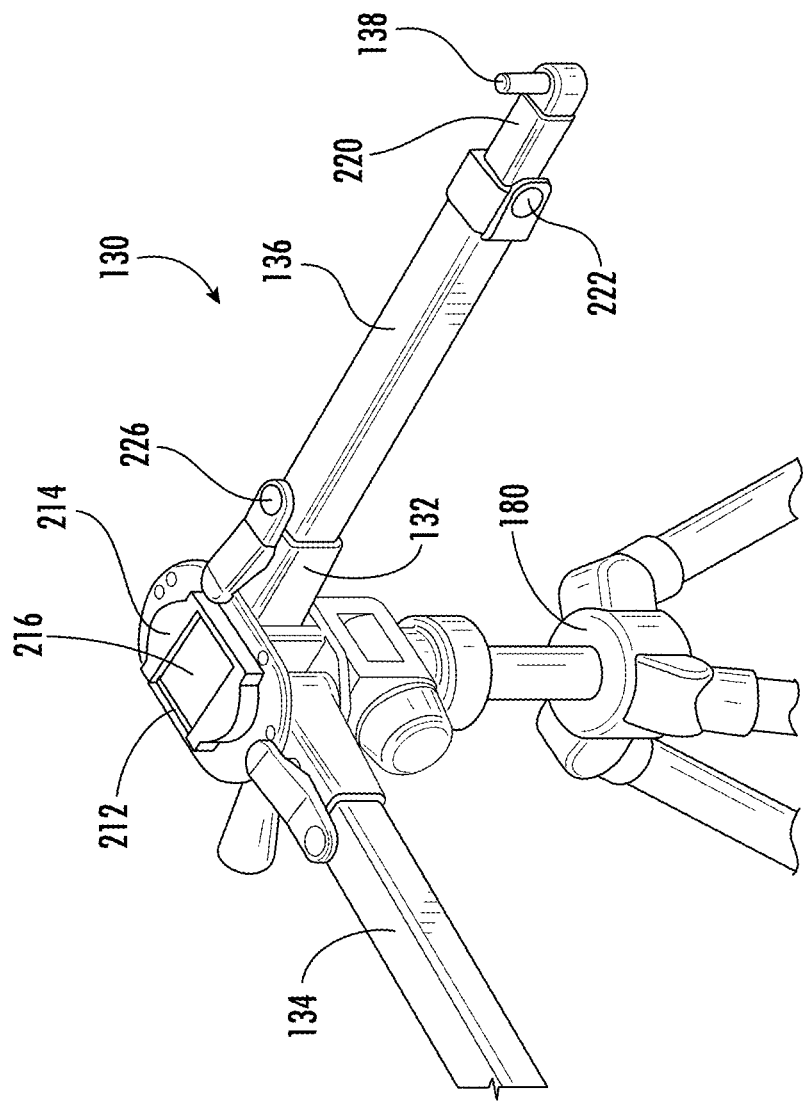
FIG. 12C illustrates the support structure of FIG. 12A in a partially-extended and locked position.

Referring now to FIGS. 12A-12C, one embodiment of a support structure 130 according to the present disclosure will now be described. As shown in FIG. 12A, extension arms 134, 136 are rotatably coupled to a central support 132 for rotating between an open configuration (FIG. 12A) and a closed or folded position (FIG. 12B). Central support 132 includes a controller mount 212 for mounting controller 110 to extension system 130. Support 212 preferably includes a pair of projections 214 on either side of a recessed portion 216 for receiving a projection 142 on a bottom surface of controller 110 (see FIG. 4A). In use, an operator slides projection 139 into recessed portion 216 to mount controller 110 to central support 132. Projections 214 preferably each include ledges for ensuring that controller 110 remains securely in place.

Extension arms 134, 136 each include a telescoping portion 220 that allows for the extension and retraction of the arms 134, 136 relative to central support 132 to select a suitable position for mounts 138 and light modules 120. An extension lock 222 may be used to lock telescoping portions 220 relative to central support 132.

As best shown in FIG. 12C, extension system 130 further includes rotational locks 226 for locking extension arms 134, 136 so that they can no longer rotate relative to central support 132. This allows the operator to select and secure light modules in a specific position (both distance and angle) from controller 110 and mobile device 140. Extension system 130 may further include a mount 139 for mounting system 130 to a suitable stand 180, such as a tripod or the like.

Figure 12D:
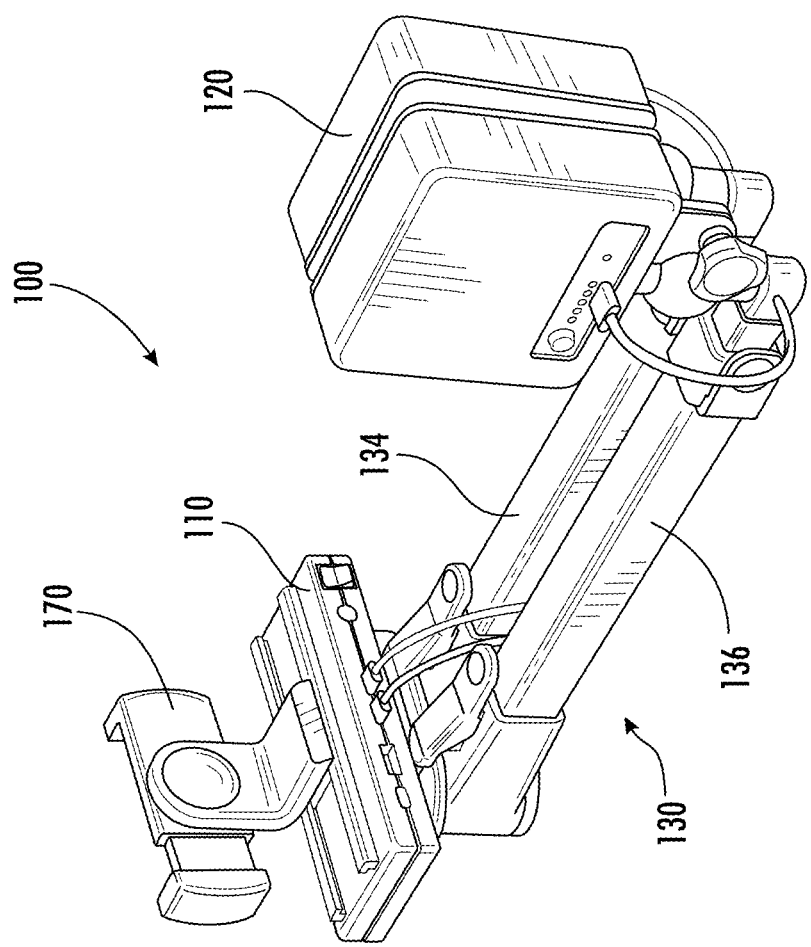
FIG. 12D illustrates the imaging system of FIG. 2 in a collapsed configuration.

FIG. 12D illustrates imaging system 100 in a collapsed configuration that may be useful, for example, for storage or during transportation of imaging system 100 from one location to another. As shown, extension arms 134, 136 of support structure 130 are in the fully retracted position with telescoping portions 220 fully retracted into the arms 134, 136. Arms 134, 136 have been rotated together to minimize the overall footprint of the system. Light modules 120 are mounted to extension arms 134, 136 and rotated together to reduce the volume taken up by this portion of the system. Controller 110 and mobile device support 170 are mounted to central support 134 of support structure 130 and ready for coupling a mobile device, such as a mobile phone, thereon.

FIG. 13 illustrates a representative imaging system 100 for use in capturing images of an object 200 according to the present invention. As shown, light modules 120 are positioned on either side of object 200 and rotated such that light is transmitted from light modules 120 onto object 200. Mobile device 140 is positioned in a generally central location such that the camera lens can be directed at and focused directly onto object 200. Mobile device 140 may be rotated and/or displaced relative to controller 110 to properly position the camera and/or lens.

In use, an operator mounts support structure 130 to a suitable stand, such as a tripod or the like, such that central support 132[is positioned in the center of object 200. Light modules 120 are mounted to extension arms 134, 136 and controller 110 is mounted to central support 132 as described above. A mobile device 140 with a camera, such as a mobile phone, is then mounted to controller 120 and positioned and/or rotated as described above to provide a view of the object 200.

Once imaging system 100 is in position as shown in FIG. 13, the operator can choose one or more lighting settings for the image. Controller 110 and/or processor 150 directs light modules 120 to emit light only in the wavelengths selected by the operator. As discussed above, controller 110 has control circuits that can allow the operator to preview the image in the selected light setting and/or orientation on a visual display, such as a computer display on processor or other visual display.

Once the operator has selected one or more light settings, controller 110 includes control software or other control circuits for directing mobile device 140 to capture one or more images in each of the selected light settings or angles to the object. The operator may separately view each of the images that have been captured on processor 150 or another suitable visual display. Controller 110 includes additional control circuits or software to view, edit, calibrate, enhance, integrate, register and/or align all of these images such that a single image and/or video can be viewed that combines some or all of the images captured by mobile device 140. These images will provide the operator with a view in different wavelengths or orientations that may allow for the detection of features that would not otherwise be detected with an image in visible light or single geometry.

Figure 14:
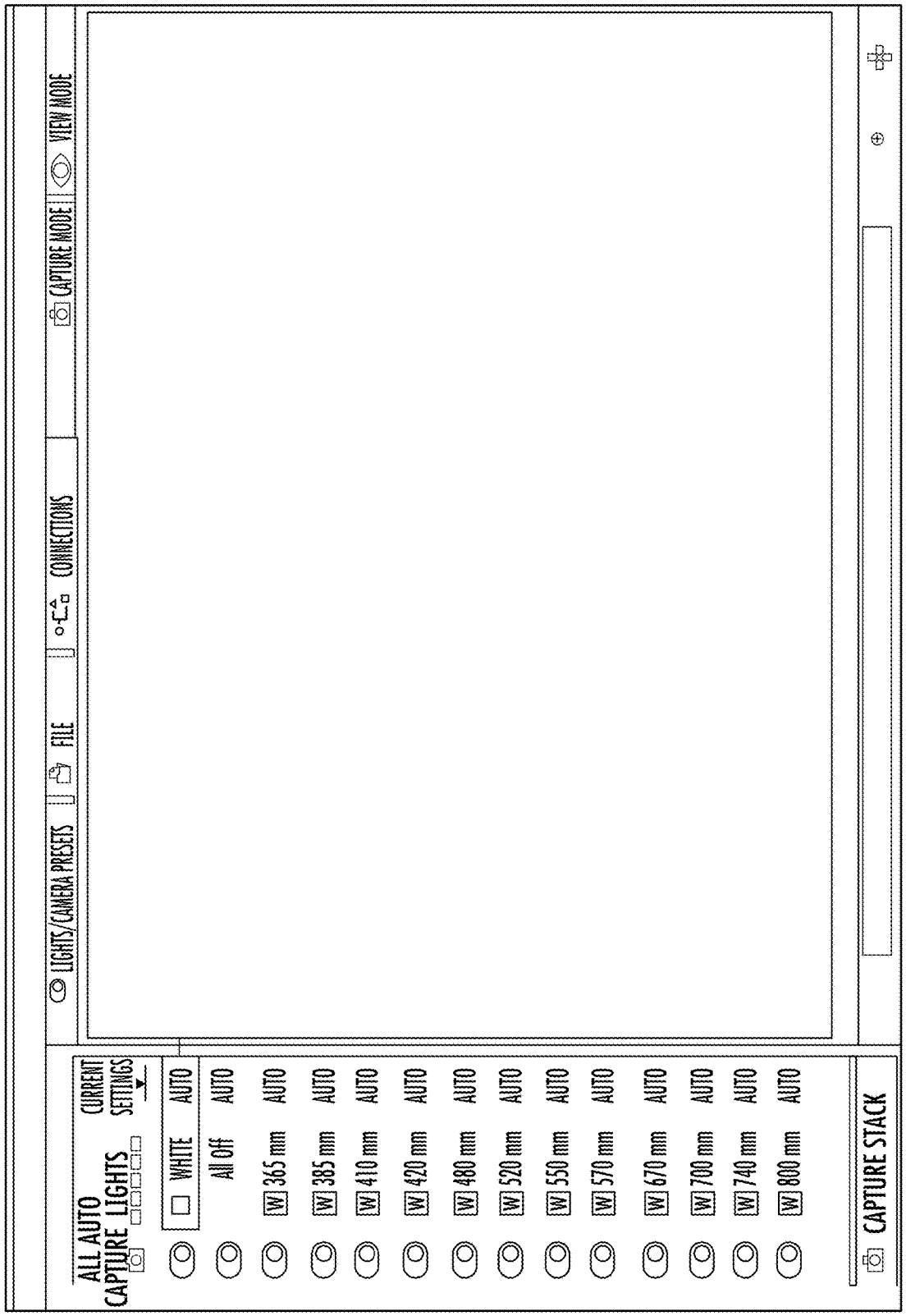
FIG. 14 illustrates a representative multispectral image captured with the imaging system of the present disclosure.

The individual or combined and registered images may be selected and saved on controller 110 and transferred to processor 150 and or the cloud-based server 152 with metadata. Alternatively, the images may be directly transferred to processor and/or cloud-based server 152 without saving them on controller 110. FIG. 14 illustrates a representative multispectral image captured with the system of the present disclosure.

Other embodiments of the invention will be apparent to those skilled in the art from consideration of the specification and practice of the disclosure provided herein. It is intended that the specification and examples be considered as exemplary only, with a true scope and spirit of the disclosure being indicated by the following claims.

What is claimed is:

1. A system for collecting multispectral images with a mobile device having a camera, the system comprising:
one or more light modules configured to emit electromagnetic energy onto an object, wherein the one or more light modules are spaced away from the mobile device and the camera, wherein each light module is configured to sequentially emit a plurality of different bands of wavelengths, wherein the plurality of different bands of wavelengths are in the UV spectrum, the IR spectrum and the visible spectrum;
a controller operatively coupled to the light modules and the mobile device, the controller being configured to control the mobile device and the light modules to capture first and second images of the object, wherein the first and second images contain the plurality of different bands of wavelengths;
a processor operatively coupled to the controller and configured to form a combined image from first and second images;
a support structure for mounting and supporting the controller, the mobile device and the light modules, the support structure comprising first and second extension arms rotatably coupled to the support structure between an open position and a folded position, wherein the extension arms are substantially parallel to each other in the folded position; and
a coupling device for coupling the mobile device to the controller or the support structure, wherein the coupling device rotatably and slidably couples the mobile device to the controller or support structure such that the mobile device is movable towards and away from the light modules.

2. The system of claim 1, wherein each of the light modules are configured to emit the electromagnetic energy in at least first, second and third bands of wavelengths and the controller is configured to capture at least a first image of the object in the first band of wavelength, a second image of the object in the second band of wavelength and a third image of the object in the third band of wavelength.

3. The system of claim 1, wherein the light modules are configured to emit the electromagnetic energy with at least first and second geometries between the light modules and the objects, and the controller is configured to capture at least a first image of the object in the first geometry and a second image of the object in the second geometry.

4. The system of claim 1, wherein the processor is disposed within the controller and the combined image is based on the plurality of different bands of wavelengths.

5. The system of claim 1, wherein the controller further comprises a user interface configured to select the plurality of different bands of wavelengths.

6. The system of claim 1, wherein the controller further comprises control circuits for operating the camera in the mobile device or other electromagnetic energy sensor in synchronization with the light sources, wherein the control circuits capture substantially all wavelengths of the plurality of different bands of wavelengths of light emitted by the one or more light modules.

7. The system of claim 1, wherein the controller is further configured to electronically record and/or transfer the first and second images and the combined image, or a single image or video.

8. The system of claim 1, wherein the support structure comprises a central support for coupling to the controller, and one or more extension arms, wherein the extension arms are movable between extended and contracted configurations, wherein the extension arms are rotatably coupled to the central support.

9. The system of claim 8, wherein the extension arms have proximal and distal ends and are coupled to the central support at the proximal ends, wherein the extension arms further comprise mounts on the distal ends for receiving and supporting the light sources.

10. The system of claim 1, wherein the light sources comprise first and second light modules, wherein the first and second light modules comprise a plurality of light sources configured to emit light in single wavelengths or bands of wavelengths.

11. The system of claim 1, wherein the one or more light modules are wirelessly coupled to the mobile device.

12. The system of claim 1, wherein the one or more light modules are positioned and oriented at a transverse angle relative to an axis extending between the object and the camera.

13. The system of claim 1, wherein the one or more light modules comprise first and second light modules positioned on opposites sides of the camera relative to an axis extending between the object and the camera.

14. The system of claim 13, further comprising a third light module positioned above or below the object relative to the axis extending between the object and the camera.

15. The system of claim 1, wherein the combined image comprises unfiltered light generated from the light modules and reflected or fluorescing from the object.

* * * * *